(12) United States Patent
Thubert

(10) Patent No.: US 10,785,094 B1
(45) Date of Patent: Sep. 22, 2020

(54) REPAIRING FALLEN LEAVES IN AN SDN FABRIC USING SUPER PODS

(71) Applicant: Cisco Technology, Inc., San Jose, CA (US)

(72) Inventor: Pascal Thubert, Roquefort les Pins (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/393,093

(22) Filed: Apr. 24, 2019

(51) Int. Cl.
*H04L 12/24* (2006.01)
*H04L 12/937* (2013.01)
*H04L 12/46* (2006.01)
*H04L 12/947* (2013.01)
*H04L 12/753* (2013.01)
*H04L 12/715* (2013.01)

(52) U.S. Cl.
CPC ...... *H04L 41/0672* (2013.01); *H04L 12/4641* (2013.01); *H04L 41/12* (2013.01); *H04L 45/48* (2013.01); *H04L 45/64* (2013.01); *H04L 49/25* (2013.01); *H04L 49/253* (2013.01)

(58) Field of Classification Search
CPC ...... H04L 41/12; H04L 12/4641; H04L 49/25
See application file for complete search history.

(56) References Cited

U.S. PATENT DOCUMENTS

| | | | | |
|---|---|---|---|---|
| 9,253,097 B1 * | 2/2016 | Barman | ................ | H04L 47/122 |
| 9,596,169 B2 * | 3/2017 | Choudhury | ............. | H04L 41/12 |
| 10,567,228 B2 * | 2/2020 | Harneja | ................... | H04L 41/12 |
| 2015/0195178 A1 * | 7/2015 | Bhattacharya | ........ | H04L 45/745 718/1 |
| 2015/0207671 A1 * | 7/2015 | Farkas | .................... | H04L 12/28 370/228 |
| 2018/0062764 A1 * | 3/2018 | Borrill | .................. | H04L 9/0852 |
| 2018/0176181 A1 * | 6/2018 | Fu | ......................... | H04L 63/101 |
| 2019/0104207 A1 * | 4/2019 | Goel | ....................... | H04L 47/18 |

OTHER PUBLICATIONS

Przygienda et al., "RIFT: Routing in Fat Trees draft-ietf-rift-rift-02" Internet Engineering Task Force: RIFT Working Group, 2018, printed Sep. 26, 2019, pp. 1-88.
"Zero Touch Provisioning" Cisco ME 1200 Series Carrier Ethernet Access Devices Controller Configuration Guide, Cisco IOS 15.6(1)SN and Later Releases, printed Mar. 19, 2019, 10 pages.

\* cited by examiner

*Primary Examiner* — Raj Jain
(74) *Attorney, Agent, or Firm* — Behmke Innovation Group LLC; Kenneth J. Heywood; Jonathon P. Western

(57) ABSTRACT

In one embodiment, a plurality of PODs is formed in a software defined networking (SDN) fabric, each POD comprising a plurality of leaf nodes and connected to a plurality of spine nodes in a spine layer of the SDN fabric. One of the plurality of PODs is designated as a super POD and link state information is provided for the entire fabric to the super POD by sending northbound advertisements in the fabric to the super POD. A disconnection is identified between a leaf node in the SDN fabric and a particular one of the spine nodes in the spine layer, based on the link state information provided to the super POD. The disconnection is repaired between the leaf node and the particular spine node in the spine layer.

20 Claims, 16 Drawing Sheets

US 10,785,094 B1

REPAIRING FALLEN LEAVES IN AN SDN FABRIC USING SUPER PODS

TECHNICAL FIELD

The present disclosure relates generally to computer networks, and, more particularly, to super PODs in a software defined networking (SDN) fabric.

BACKGROUND

Software defined networking (SDN) represents an evolution of computer networks away from a decentralized architecture to one of centralized, software-based control. More specifically, in traditional computer networks, the control plane (e.g., selection of the routing path) and the data plane (e.g., forwarding packets along the selected path) are intertwined, with control plane decisions being made in a decentralized manner via signaling between the networking devices. In contrast, control plane decisions in an SDN-based network architecture are made by a centralized controller and pushed to the networking devices, as needed.

While applicable to any number of different types of network deployments, SDN is particularly of relevance to cloud service provider networks. Indeed, in a traditional client-server architecture, the network need only support traffic between the client and the server. However, with cloud computing, each transaction with a client may result in a large amount of "east-west" traffic between nodes in the cloud (e.g., to perform a query or computation in parallel, etc.), as well as the traditional "north-south" traffic between the cloud and the client. In addition, the very nature of cloud computing environments allows for the rapid scaling of resources with demand, such as by spinning new nodes up or down. In such situations, centralized control over the control plane results in better network performance over that of decentralized control.

While SDN fabrics offer certain advantages over traditional networking approaches, discovery of disconnections between nodes in the spine layer of an SDN fabric and nodes in the leaf layer remains challenging.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
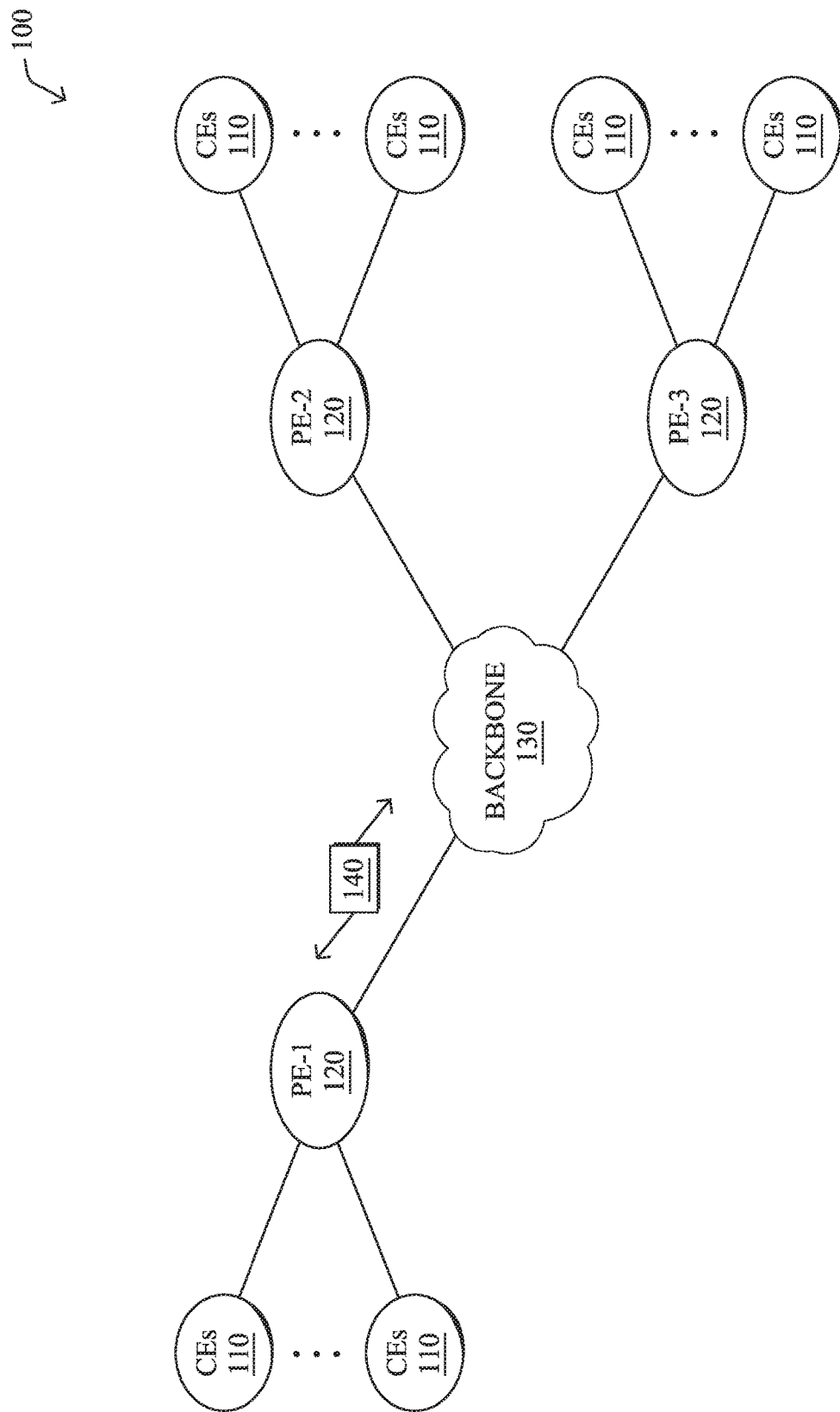
FIGS. 1A-1B illustrate an example computer network.

According to one or more embodiments of the disclosure, a plurality of PODs is formed in a software defined networking (SDN) fabric, each POD comprising a plurality of leaf nodes and connected to a plurality of spine nodes in a spine layer of the SDN fabric. One of the plurality of PODs is designated as a super POD and link state information is provided for the entire fabric to the super POD by sending northbound advertisements in the fabric to the super POD. A disconnection is identified between a leaf node in the SDN fabric and a particular one of the spine nodes in the spine layer, based on the link state information provided to the super POD. The disconnection is repaired between the leaf node and the particular spine node in the spine layer.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B 1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
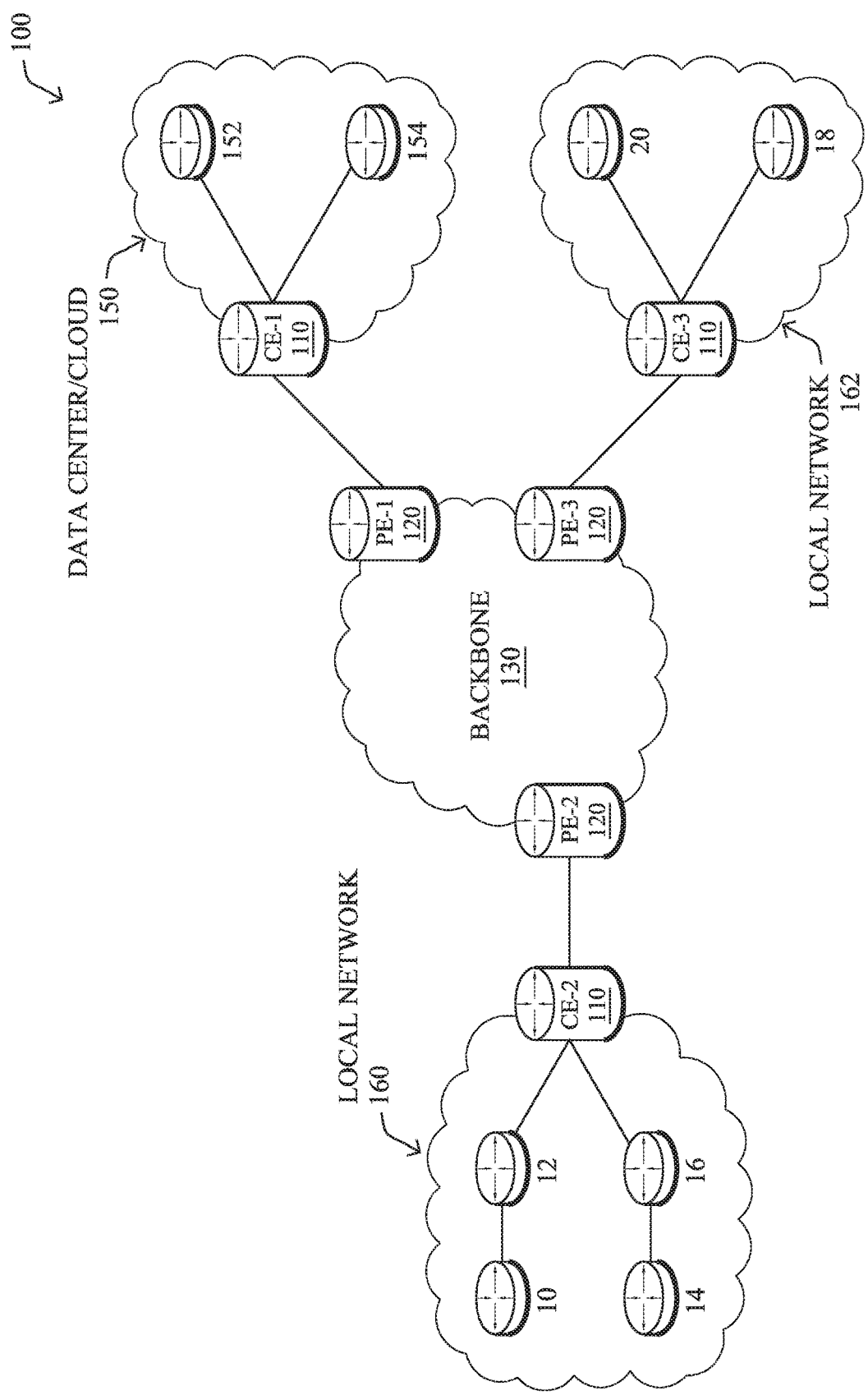

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
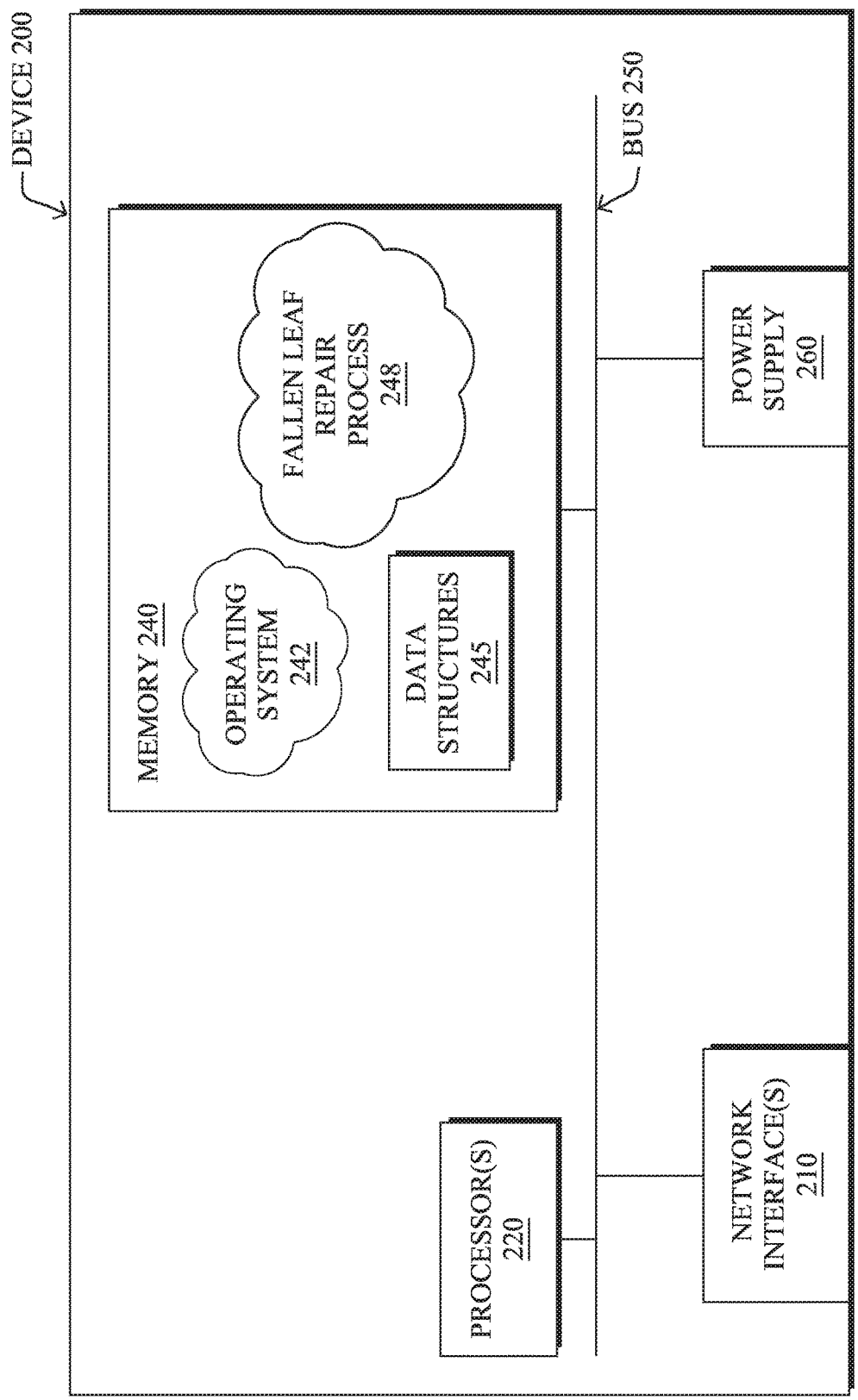
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a fallen leaf repair process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, software defined networking (SDN) represents an evolution of computer networks that centralizes control plane decisions with a supervisory device. For example, in Application Centric Infrastructure (ACI), an SDN-based architecture from Cisco Systems, Inc., control plane decisions may be made by a centralized APIC. However, even with centralized control, there still exists the potential for seasonal congestion to occur on certain links in the network fabric.

In general, an SDN-based network fabric may utilize a leaf-spine architecture, such as CLOS and Fat-Tree architectures. This is particularly true in the case of data center and cloud networks that are poised to deliver the majority of computation and storage services in the future. In a Fat-Tree, nodes are organized in a tree structure with branches becoming 'fatter' towards the top of the hierarchy. In the context of computer networks, this increasing 'fatness' typically corresponds to increasing bandwidth towards the top of the hierarchy. CLOS networks typically involve multiple stages (e.g., an ingress stage, a middle stage, and an egress stage), with 'crossbar' switches at different stages that are interwoven such that multiple paths are available for switching, so that one traffic flow does not block another.

As would be appreciated, an SDN fabric that implements a leaf-spine architecture may operate by emulating a very large switch by interleaving many smaller switches, resulting in much lower cost and higher scalability. The benefits of such designs include, but are not limited to, the availability of an equal cost multi-path (ECMP) based switching fabric, a simplified network, and fully utilized link bandwidth on each network node. It also allows the networks to scale and grow incrementally, on demand. Cisco's next generation SDN based data center network fabric architecture, ACI, is also based on CLOS design principles.

Figure 3A:
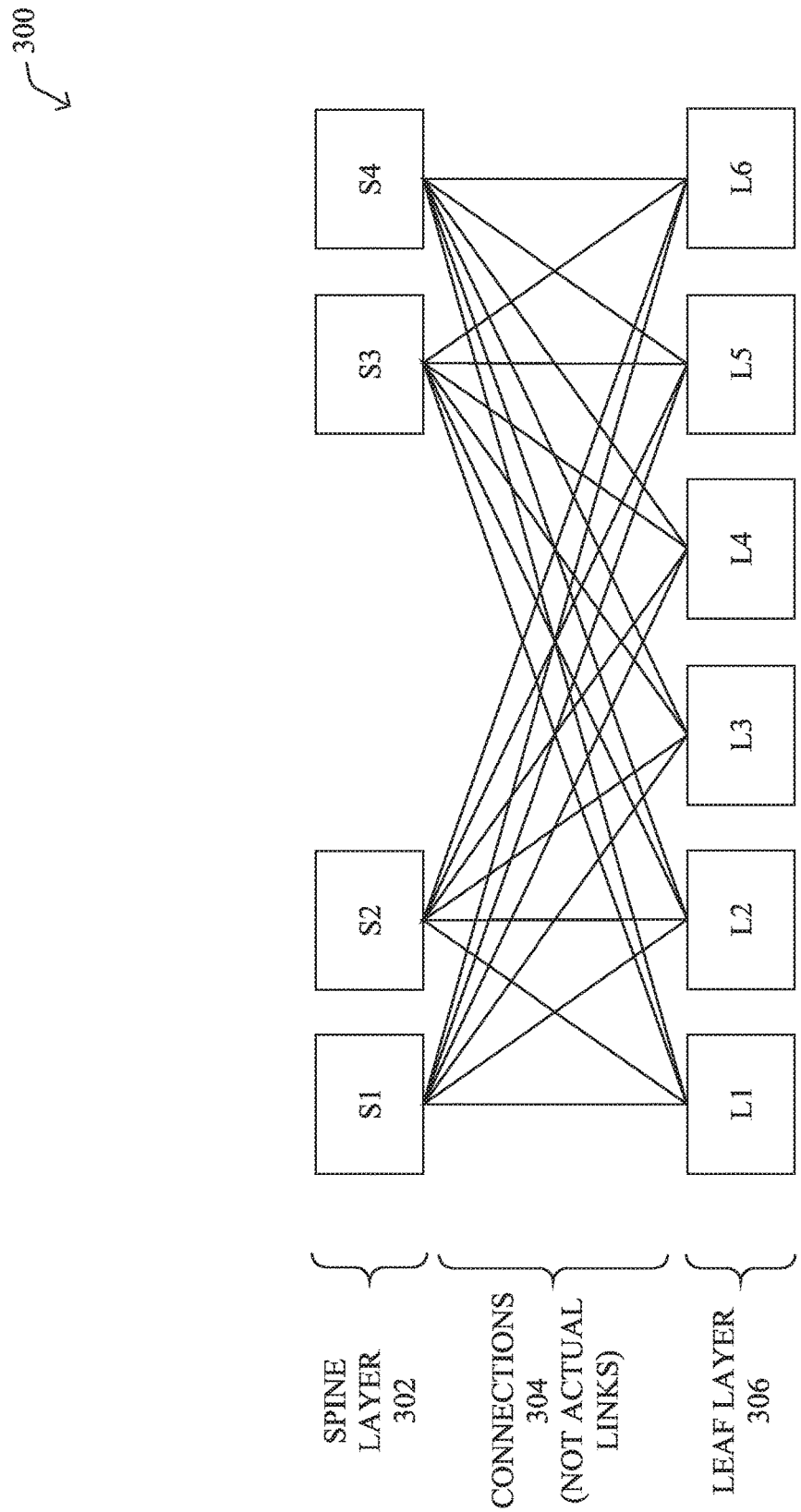
FIGS. 3A-3E illustrate examples of software defined networking (SDN) fabric implementations.

FIG. 3A illustrates a simplified example of an SDN fabric 300 that uses a leaf-spine architecture. As shown, the network switches S1-S4 and L1-L6 may be organized according to CLOS design principles. In particular, switches S1-S4 may form a superspine 302. This layer is also sometimes called the Top of Fabric (ToF) layer, such as in RIFT. At the south of fabric 300 is a leaf layer 306 that comprises switches L1-L6 and provide connectivity to the various clients of fabric 300, such as endpoints or virtual machines (VMs), and implement Layer 2 bridging and Layer 3 routing functions. Likewise, S1-S4 in superspine layer 302 may be fully meshed with L1-L6 in leaf layer 306 via connections 304, which are not actual links, in the physical sense. During operation, S1-S4 may provide redundant paths and connectivity from a previous lower-level stage switch in the network fabric.

Figure 3B:
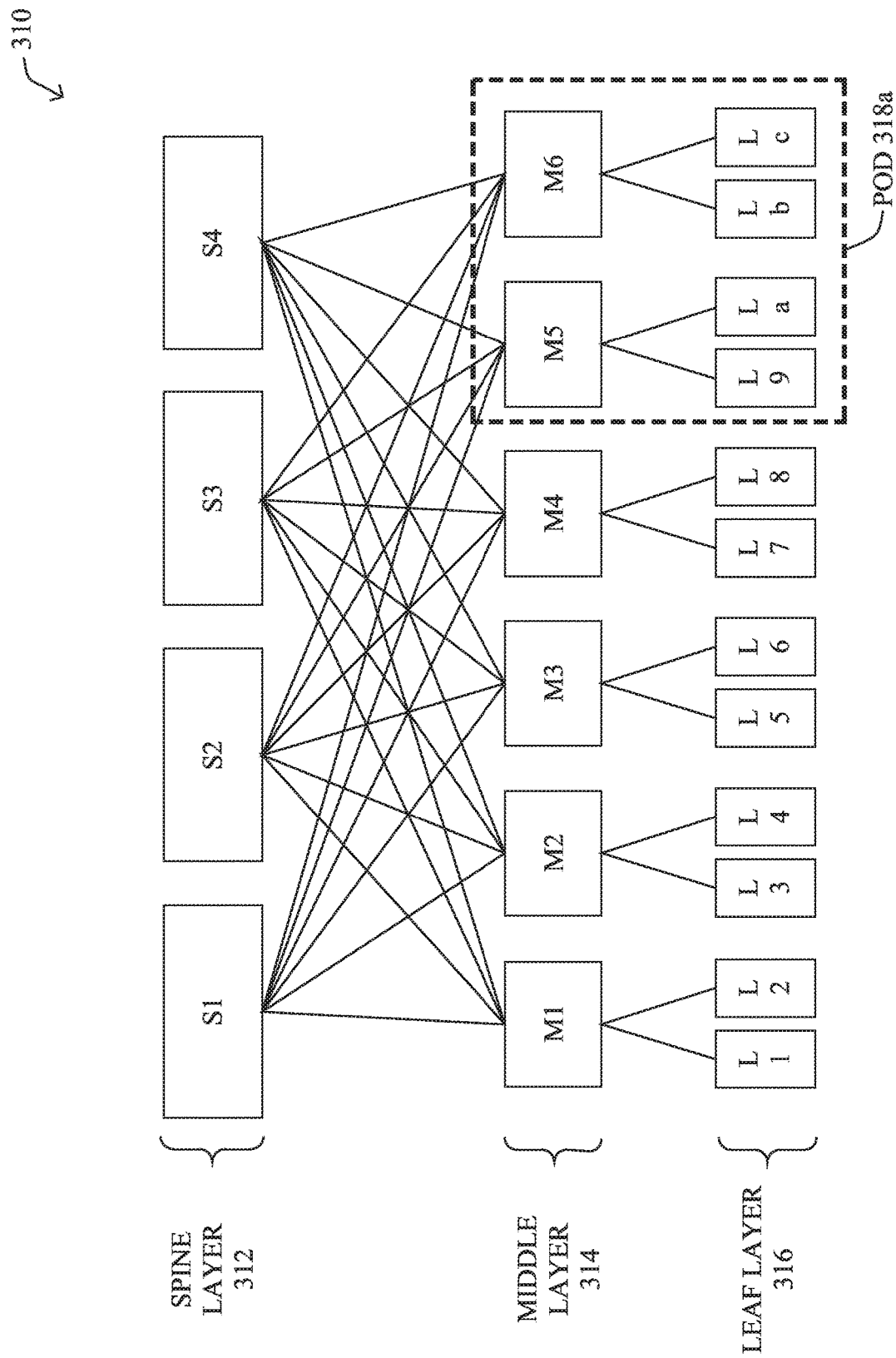

FIG. 3B illustrates another example SDN fabric 310 that uses a CLOS-based approach. As shown, at the top of fabric 310 are switches S1-S4 that form a spine layer 312 that are connected to a middle layer 314 comprising switches M1-M6 which are, in turn, connected to a leaf layer 316 comprising switches L1-Lc. The overall function of fabric 310 may be similar to that of fabric 300 in FIG. 3A, with the addition of middle layer 314 that may perform, for example, aggregation functions. Leaf switches and their corresponding switches in middle layer 314 may also form PODs, such as POD 318a shown.

Today, a large, virtualized data center fabric might be comprised of approximately 500-1000 leaf switches and as many as approximately 8-16 spine switches servicing many of its tenant's virtual networks on the shared, physical network infrastructure. Each leaf switch, in turn, may be connected to between 32-98 physical hypervisor servers, with each server hosting approximately 20 virtual servers/endpoints that estimate to between 1000-2000 endpoints connected per leaf switch. In such a shared network deployment, network access security becomes an important factor for consideration.

More specifically, in virtualized data center deployments, like ACI, the movement of endpoints from one leaf port to another, or from one endpoint group (typically tied to the dot1q VLAN the vSwitch tags to outgoing packets) to another within the same leaf or across leaf switches of the network fabric, is very common. In such loosely-coupled network connectivity models, where the locality of the endpoints is not fixed, the network fabric and the endpoints become vulnerable to attacks by the rogue devices. For example, if the initial network access or the subsequent endpoint moves are allowed without any verification, it might lead to severe security issues. This enforces an important requirement on the underlying first hop switches that are responsible for network connectivity: to grant network access only to authorized endpoints and deny connectivity to unauthorized devices.

To limit the number of ports per leaf switch, leaves are grouped in PODs, such as POD 318a. As would be appreciated a POD in an SDN fabric is a cross bar of smaller switches and can be seen as a large, virtual leaf node, characterized by its Radix.

Figure 3C:
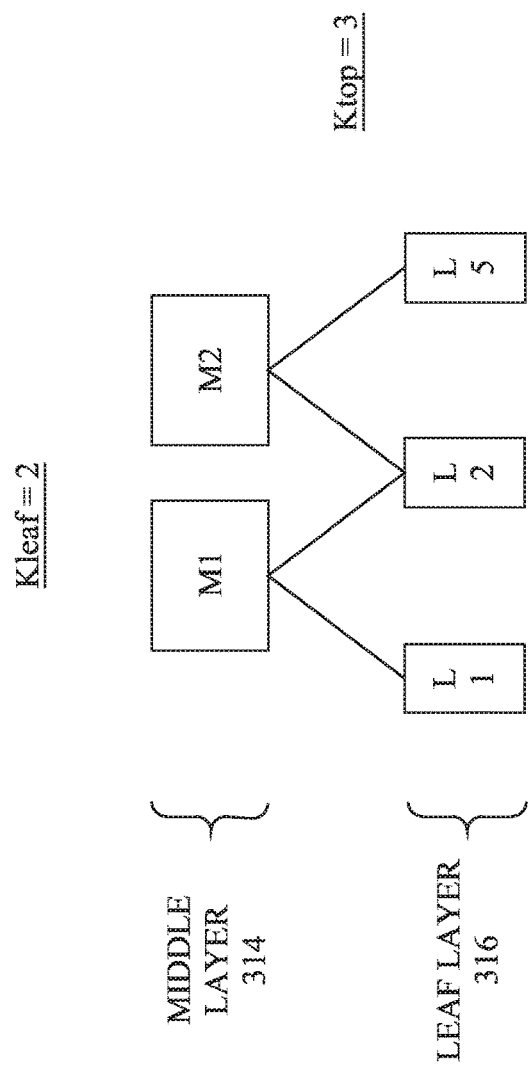

FIG. 3C illustrates an example POD 318 that can be formed by linking switches in middle layer 314 with those in leaf layer 316. As shown, POD 318 has (K=Radix/2) ports connecting upward and as many downward, with Kleaf=2 top nodes of Ktop ports down connected to Ktop leaves with Kleaf ports upward. This creates a virtual leaf node of (Kp=Kleaf*Ktop) ports. From there, PODs of PODs can be constructed recursively within the SDN fabric.

A Fat-Tree has a number of PODs interconnected by a superspine. In an ideal fabric, there is at least one port per Top of POD (ToP) switch on every Top-of-Fabric (ToF) switch in the superspine. This means that every northbound port of a leaf has a path to every spine node. In that case, the superspine is fully meshed with the POD top switches, and the fabric is NOT partitioned. For example, in FIG. 3B, assume that M1-M2 and M3-M4 in middle layer 314 also form PODs with POD 318a. In such a case, the network would not be considered partitioned, as each of the PODs is fully meshed with spine layer 312.

In the case in which each POD is fully connected to spine layer 312, a spine node has a Radix (number of ports) Rs=Np*Kleaf, where Np is the number of PODs. This makes the connectivity from any spine node to any leaf node resilient to Kleaf-1 breakages in between. However, Rs rapidly becomes a gating factor for scalability, limiting the number of PODs that can be attached to the superspine, in many implementations.

Figure 3D:
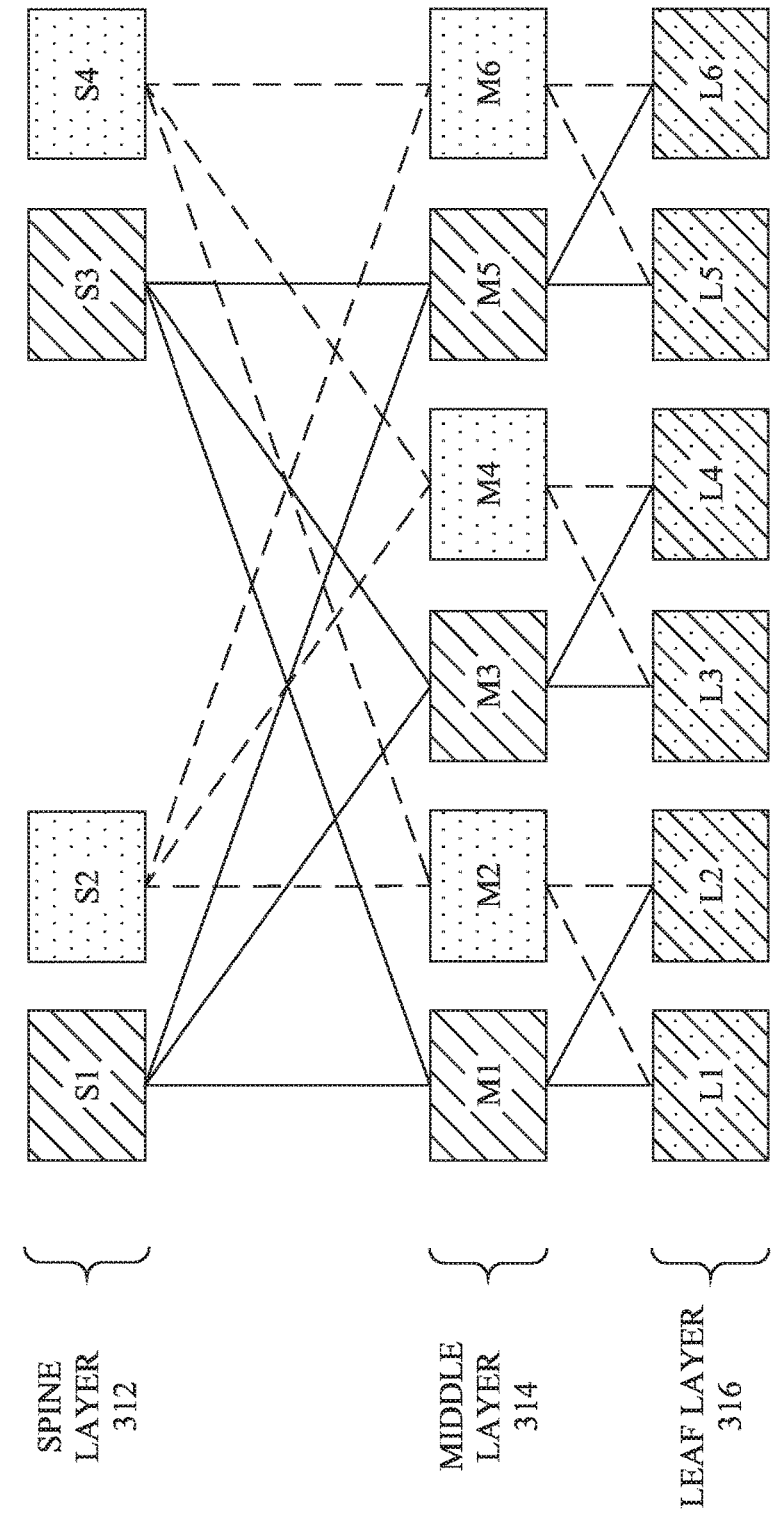

In large fabric, or fabrics built from switches with a low Radix, the ToF is often partitioned in planes. FIG. 3D illustrates an example SDN fabric 320 in which the fabric is partitioned into two separate planes: Plane 1 and Plane 2. As shown, while each ToF switch in spine layer 312 is still connected to each leaf in leaf layer 316, not every ToF switch in superspine layer is connected to every ToP switch in middle layer 314. This means that the redundancy is reduced, in comparison to non-partitioned fabrics.

Figure 3E:
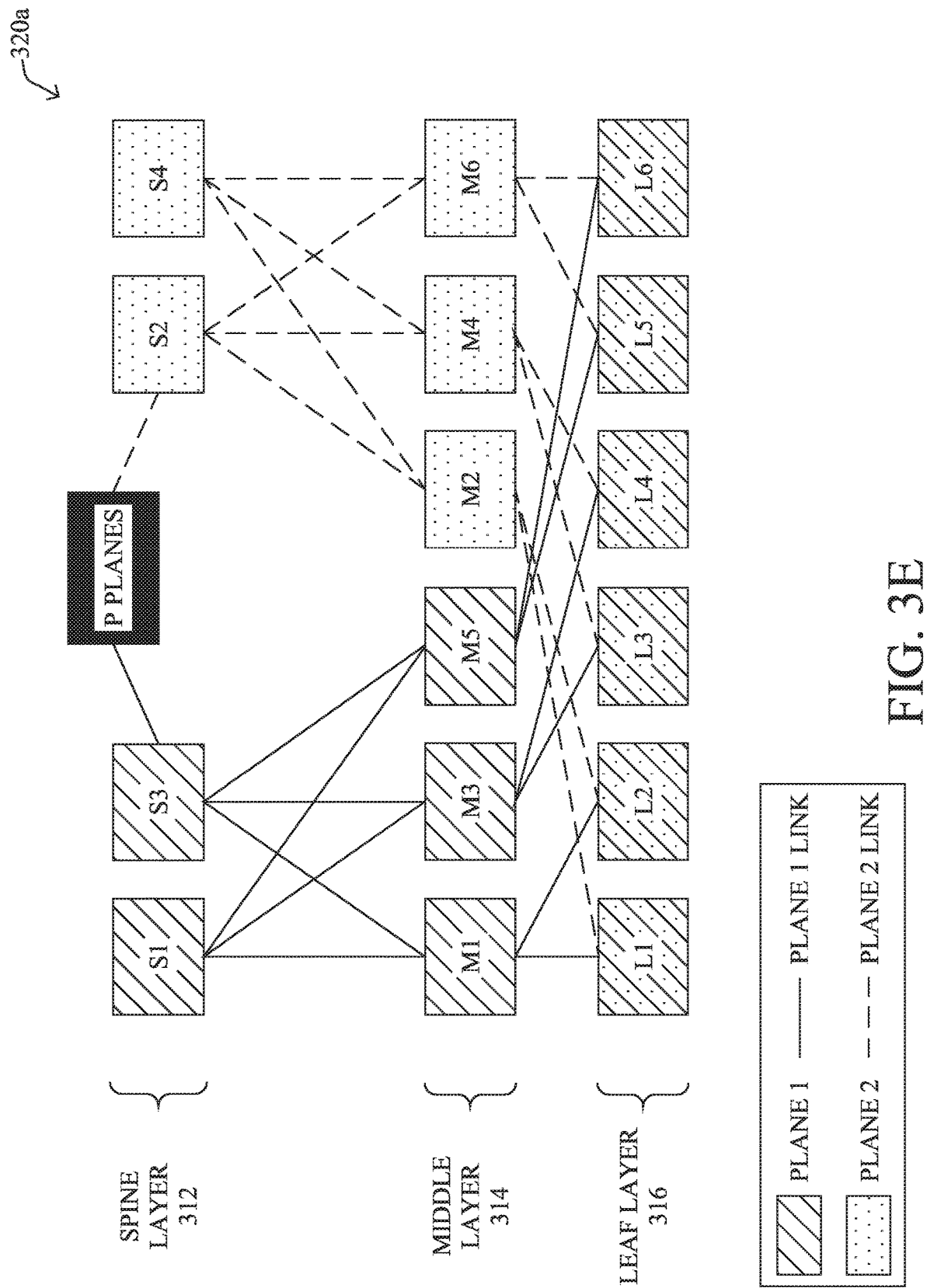

FIG. 3E illustrates another example SDN fabric 320a in which the fabric has been partitioned into P+2 number of planes: plane 1, plane 2, and P-number of other planes. As would be appreciated, the decision as to which plane to use in SDN fabric 320a is left to the leaves in leaf layer 316. In addition, a failure of an intermediate link or switch typically affects one or more planes, but not all.

The minimum connectivity for an SDN fabric, such as fabric 320a, is when each leaf in leaf layer 316 has a single path to each node in spine layer 312, which happens when every ToF node connects to only one ToP node in each POD. This means that, at a maximum, there are exactly as many planes as there are northbound ports on a leaf Node (Kleaf=P*R). In that case, the ToF is maximally partitioned.

A failure in a link or switch of a partitioned SDN fabric causes an unbalance of capacity between planes. Depending on the redundancy factor, this can be an unbalance of throughput capacity, or a difference of reachability, with some destinations being reachable only via certain planes. This defeats the equal cost multipath (ECMP) load balancing operation by which the ingress leaf selects the next hop, and thus a plane, on a per packet base. Depending on the ECMP operation, all flows may be lightly affected, or a subset of flows may be more significantly affected.

As used herein, a "fallen leaf" refers to a leaf that can be reached only by a subset of ToF nodes in the superspine layer, but cannot be reached by all, due to missing connectivity. If R is the redundancy/resiliency factor, then it takes at least R breakages to reach a fallen leaf situation. In a fully partitioned fabric, the redundancy factor R is 1, so any breakage may cause one or more fallen leaves. In a general case, with R or more breakages, some spine nodes may be isolated from some leaf nodes.

Figure 4A:
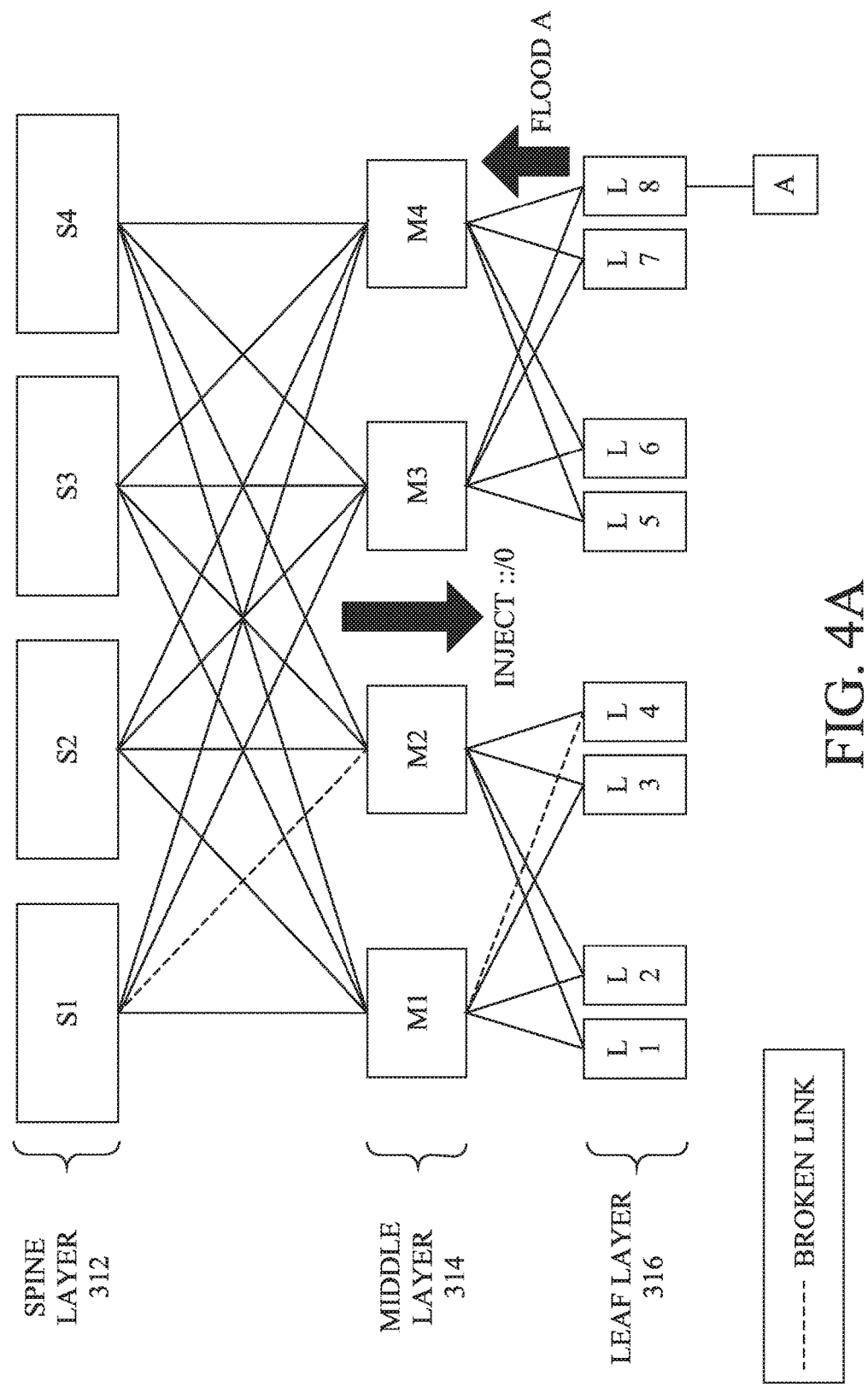
FIGS. 4A-4D illustrate examples of disaggregation and failures in an SDN fabric.

FIG. 4A illustrates an example SDN fabric 400 exhibiting a fallen leaf scenario. As shown, assume that the link between leaf L4 in leaf layer 316 and M1 in middle layer 314 has failed. Similarly, the link between S1 in spine layer 312 and M2 in middle layer 314 has also failed. In such a case, spine node S1 is completely isolated from fallen leaf L4.

In a routing protocol such as the Routing In Fat Trees (RIFT) protocol, leaves in leaf layer 316 only see a default route north (e.g., towards spine layer 312) using a distance vector advertisement. In contrast, the ToF nodes in spine layer 312 get the full view south (e.g., towards leaf layer 316) using link state flooding, as shown. In the fallen leaf scenario shown, floodings regarding fallen leaf L4 do not reach S1. This means that S1 cannot forward packets to prefix A that is attached to L4.

In RIFT, disaggregation is the process by which nodes transmit southward exceptions to the default route. For example, all nodes at L1 can use all spine nodes in spine layer 312 as default routers, with the exception of S1 when reaching for A.

One consequence of the fallen leaf problem is that some prefixes attached to the fallen leaf become unreachable from some of the ToF nodes. RIFT proposes two methods to address this issue: positive and the negative disaggregation. Both methods flood so called South Topology Information Elements (S-TIEs) to advertise the impacted prefix(es).

When used for the operation of disaggregation, a positive S-TIE, as usual, indicates reachability to a prefix of given length and all addresses subsumed by it. In contrast, a negative route advertisement indicates that the origin cannot route to the advertised prefix.

Figure 4B:
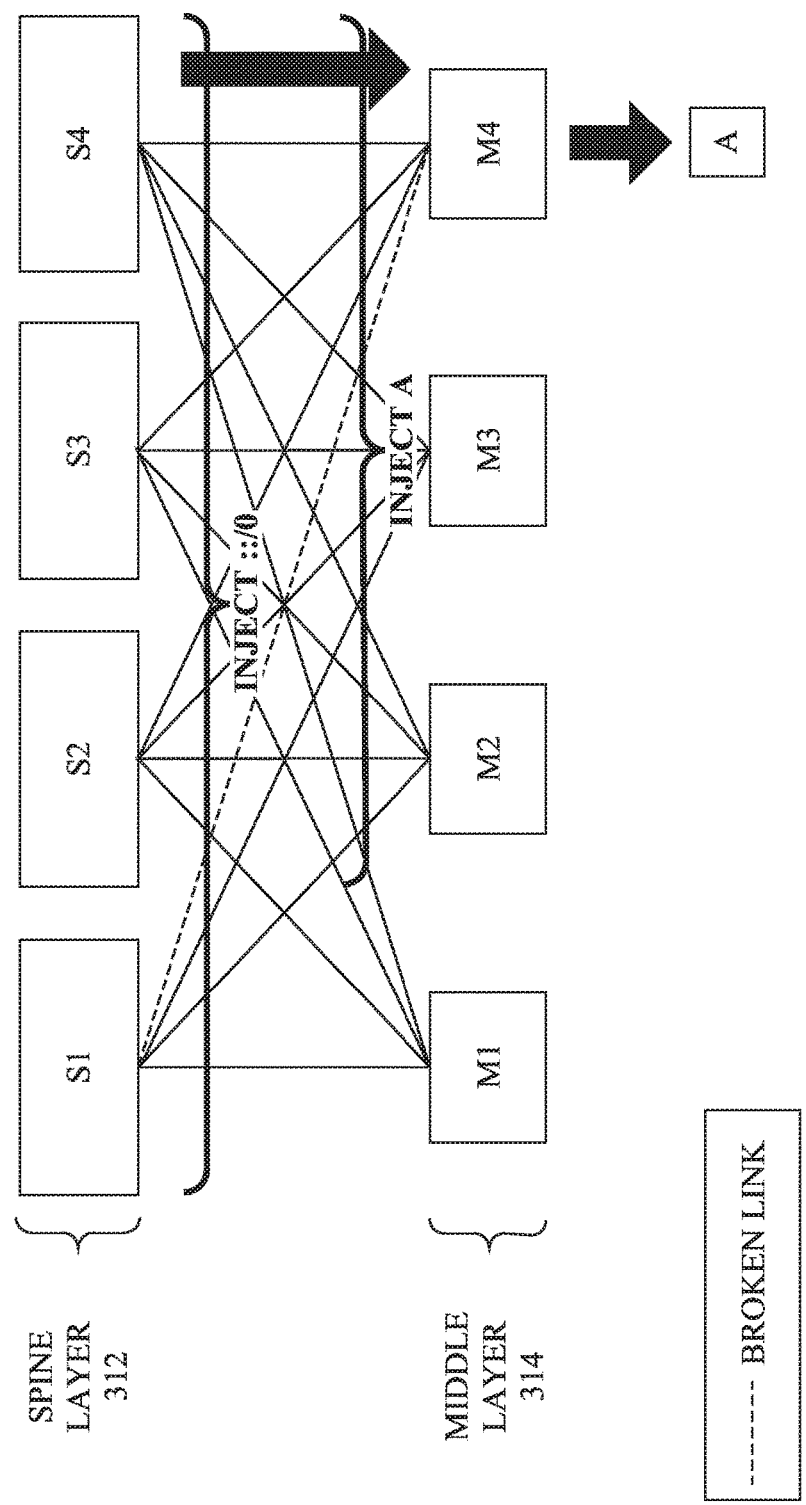

The positive disaggregation is originated by a router that can still reach the advertised prefix, and the operation is not transitive, meaning that the receiver does not generate its own flooding south as a consequence of receiving positive disaggregation advertisements from a higher-level node. The effect of a positive disaggregation is that the traffic to the impacted prefix will follow the prefix longest match and will be limited to the northbound routers that advertised the more specific route. FIG. 4B illustrates an example 410 of positive disaggregation, in the case in which prefix A is not reachable by S1, due to a broken link.

In contrast, negative disaggregation is transitive, and is propagated south, when all the possible routes northwards are barred. A negative route advertisement is only actionable when the negative prefix is aggregated by a positive route advertisement for a shorter prefix. In that case, the negative advertisement carves an exception to the positive route in the routing table, similar to "punching a hole," making the positive prefix reachable through the originator with the special consideration of the negative prefix removing certain next hop neighbors.

Figure 4C:
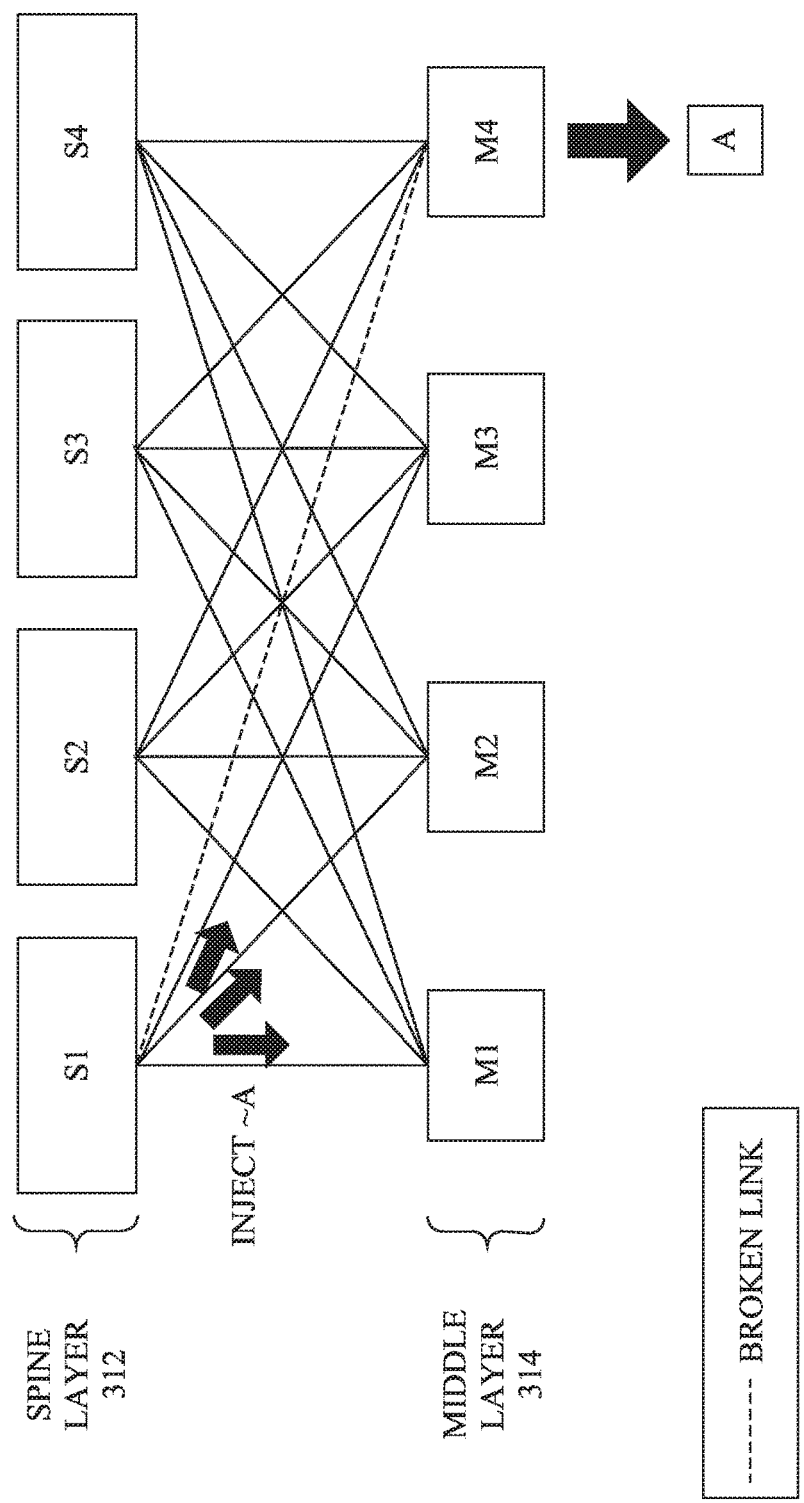

For example, as shown in example 420 in FIG. 4C, assume again that prefix A is unreachable from S1 due to a broken link. Assume further that S1 determines that prefix A exists and is not reachable. As a consequence, S1 injects a new negative route to all of its children, causing them to install a route to A via all of their parents for which they did not receive a negative route to A (e.g., parents S2-S4 shown). In such a case, only three messages are needed, instead of twelve for the same route information.

When the ToF is not partitioned, the collective southern flooding of the positive disaggregation by the ToF nodes that can still reach the impacted prefix is generally enough to cover all the switches at the next level south, typically the ToP nodes. If all of those switches are aware of the disaggregation, they collectively create a ceiling that intercepts all the traffic north and forwards it to the ToF nodes that advertised the more specific route. In that case, the positive disaggregation alone is sufficient to solve the fallen leaf problem.

On the other hand, when the fabric is partitioned in planes, the positive disaggregation from ToF nodes in different planes do not reach the ToP switches in the affected plane and cannot solve the fallen leaves problem. In other words, a breakage in a plane can only be solved in that plane. Also, the selection of the plane for a packet typically occurs at the leaf level and the disaggregation must be transitive and reach all the leaves. In that case, negative disaggregation is necessary.

Figure 4D:
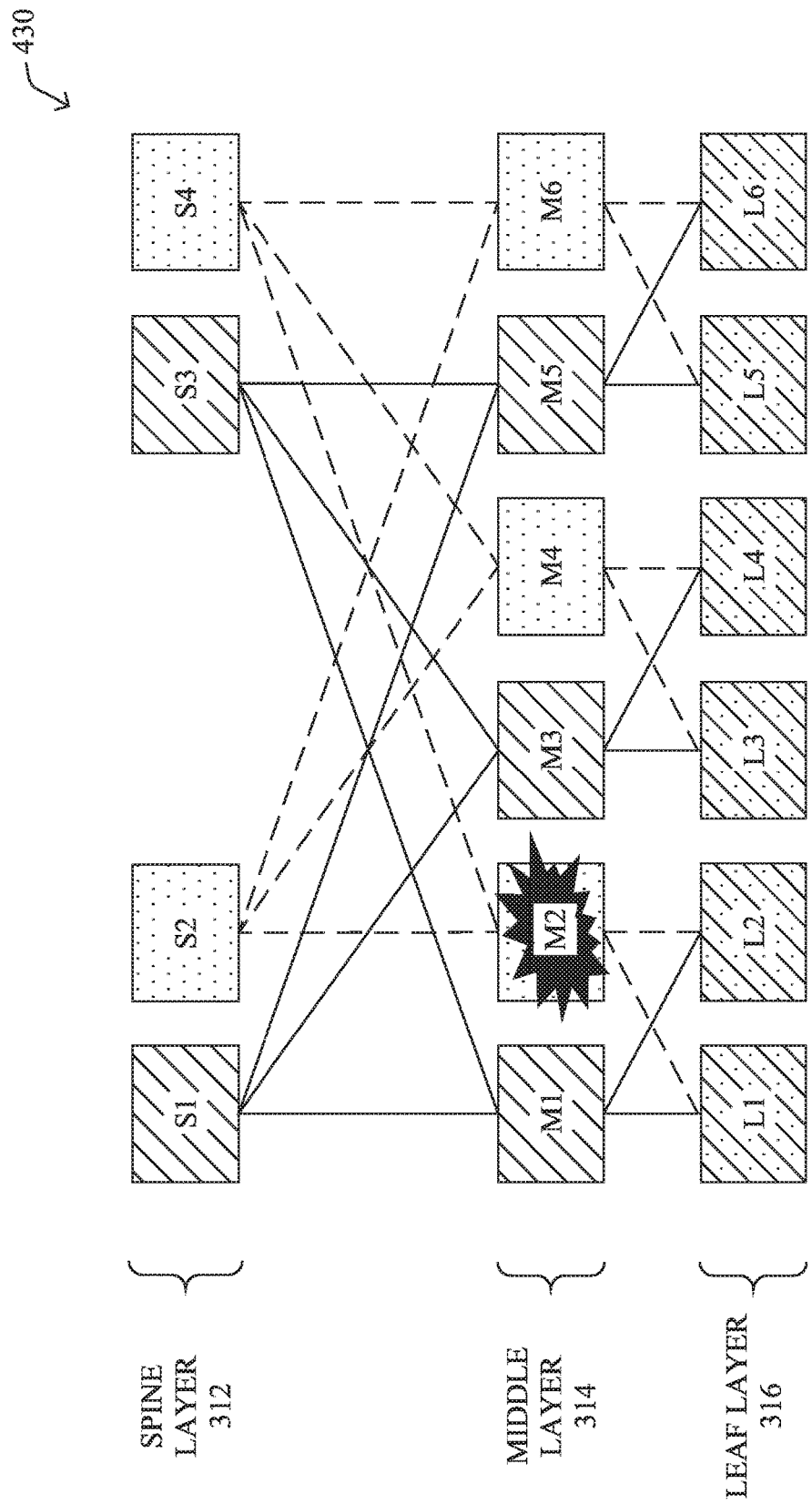

By way of example of the challenges with fallen leaves in partitioned fabrics, consider the case shown in FIG. 4D. As shown, assume that M2 in fabric 430 experiences a failure and that fabric 430 is partitioned into two planes: plane 1 and plane 2, with M2 belonging to the latter plane. In such a case, positive disaggregation from the nodes in spine layer 312 belonging to plane 1 do not reach the nodes in middle layer 314 belonging to plane 2, meaning that positive disaggregation cannot be used to reconnect fallen leaf L2.

Repairing Fallen Leaves in an SDN Fabric Using Super PODs

The techniques herein propose turning a POD in an SDN fabric into a "super POD" that has total network visibility and the ability to repair disconnections of fallen leaves in the fabric. In some aspects, the techniques herein may leverage RIFT mechanisms, to promote a POD to a super POD able to identify and rectify fallen leaves in the SDN fabric.

Specifically, in various embodiments, a plurality of PODs is formed in a software defined networking (SDN) fabric, each POD comprising a plurality of leaf nodes and connected to a plurality of spine nodes in a spine layer of the SDN fabric. One of the plurality of PODs is designated as a super POD and link state information is provided for the entire fabric to the super POD by sending northbound advertisements in the fabric to the super POD. A disconnection is identified between a leaf node in the SDN fabric and a particular one of the spine nodes in the spine layer, based on the link state information provided to the super POD. The disconnection is repaired between the leaf node and the particular spine node in the spine layer.

Illustratively, the techniques described herein may be performed by hardware, software, and/or firmware, such as in accordance with the fallen leaf repair process 248 which may include computer executable instructions executed by the processor 220 (or independent processor of interfaces 210) to perform functions relating to the techniques described herein.

Figure 5A:
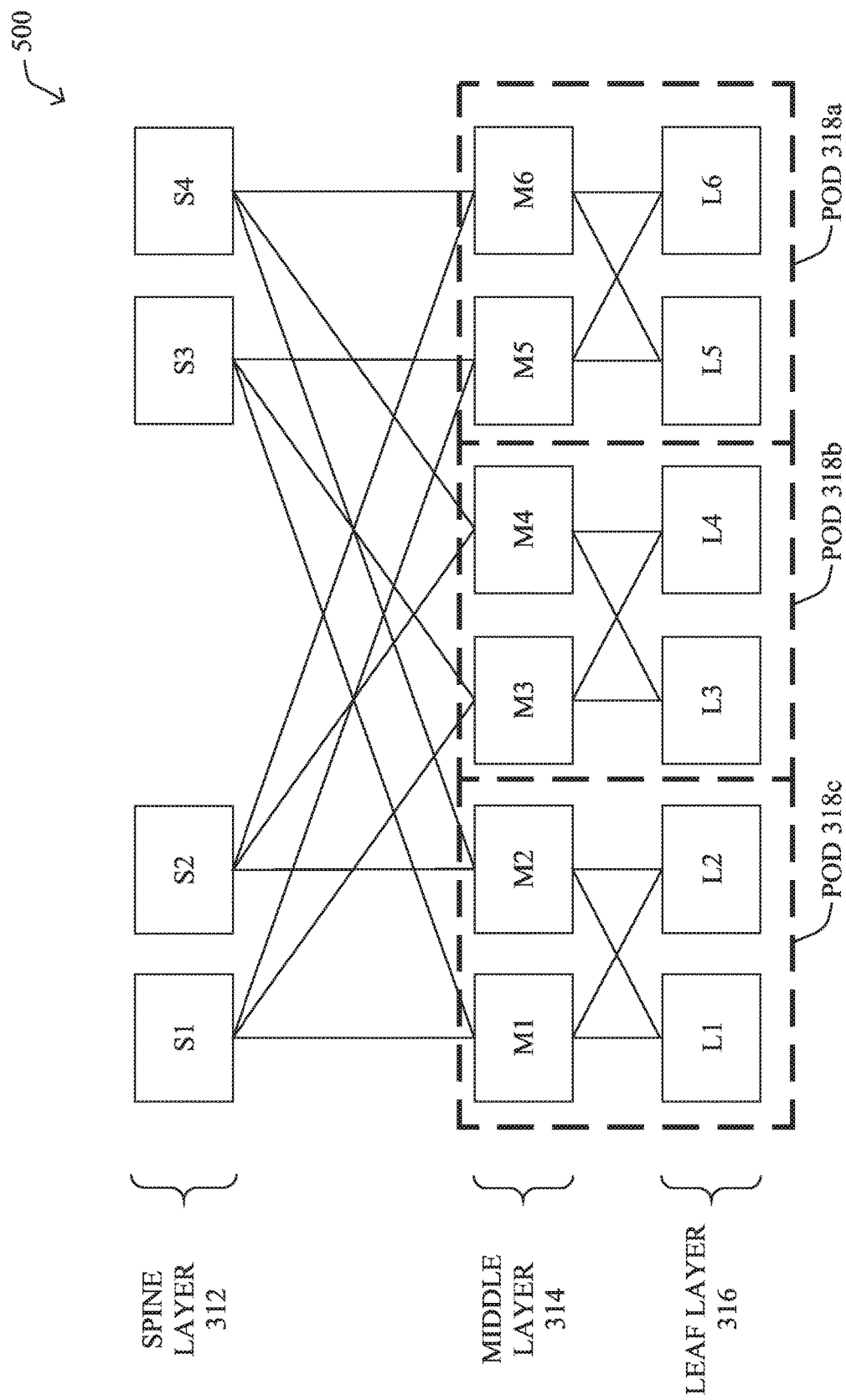
FIGS. 5A-5C illustrate the designation and use of a super POD in an SDN fabric.
Figure 5B:
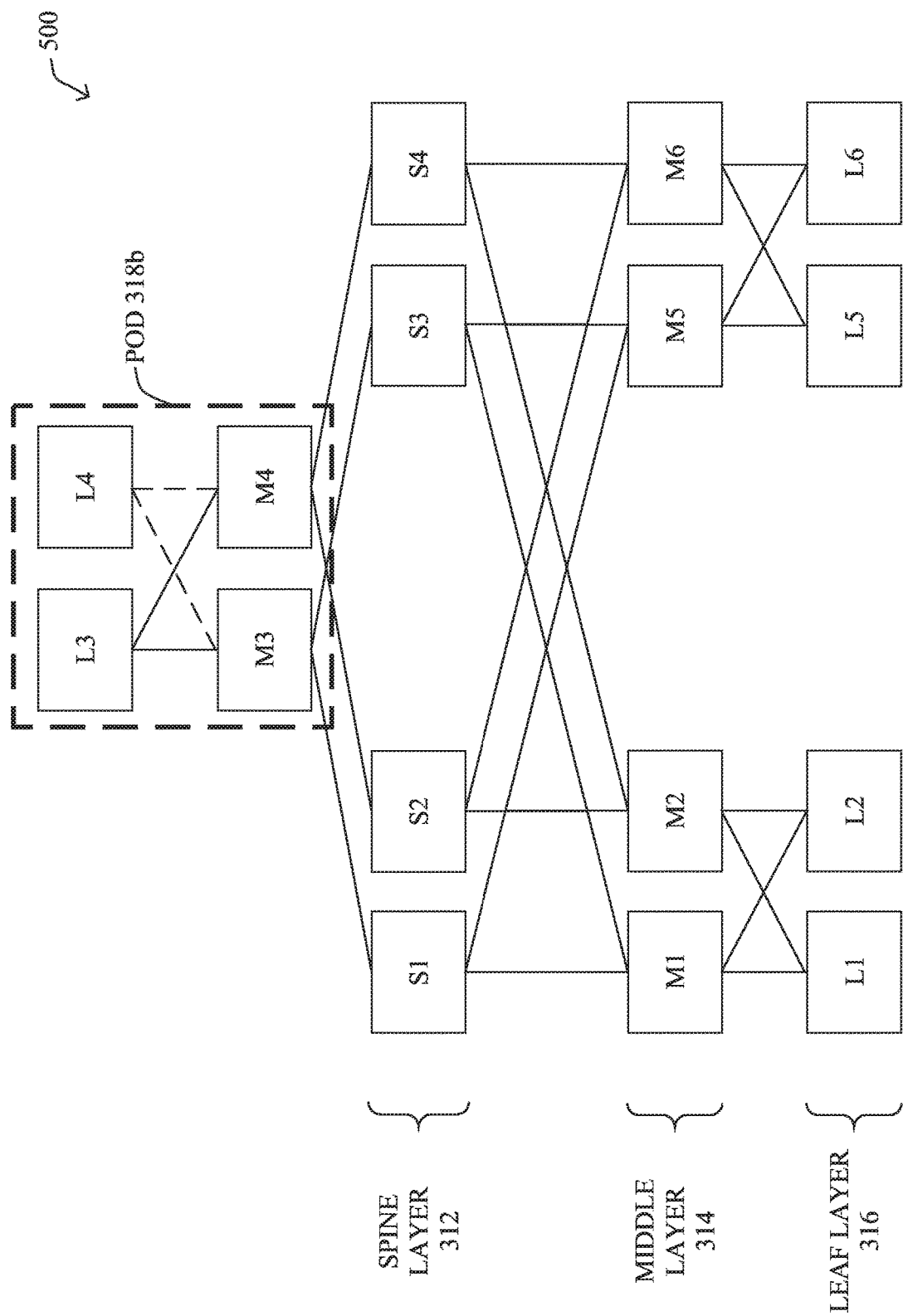
Figure 5C:
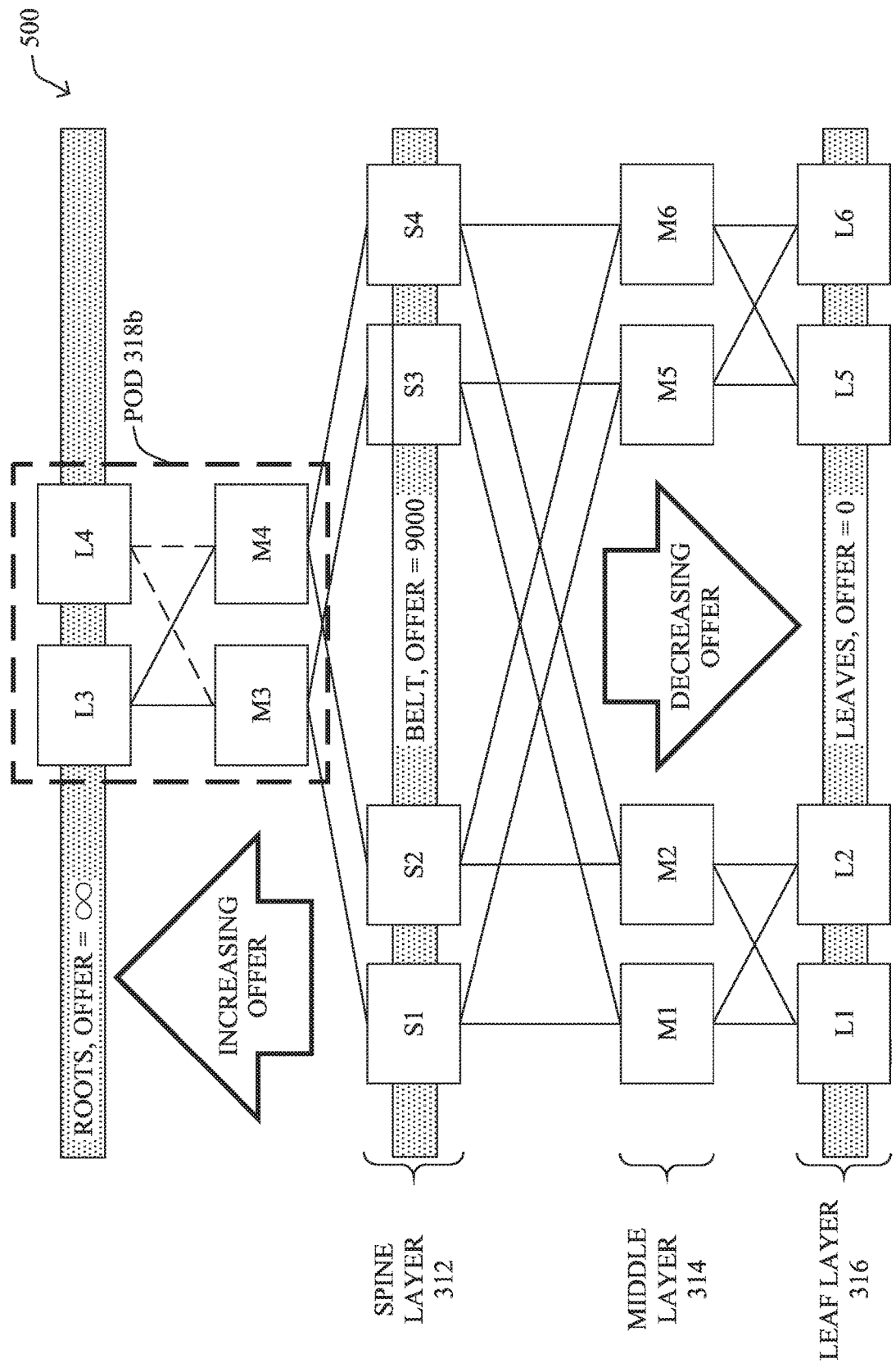

Operationally, FIGS. 5A-5C illustrate the designation and use of a super POD in an SDN fabric, according to various embodiments. In FIG. 5A, assume that SDN fabric 500 includes spine layer 312, middle layer 314, and leaf layer 316 described previously. As noted, any number of PODS may be formed in SDN fabric 500, such as PODs 318a-318c.

A key observation herein is that a superspine can be used to discover fallen leaves in an SDN fabric and initiate corrective measures, such as negative disaggregation. The superspine can be routing or non-routing, in various embodiments. If routing, then there is no need to perform disaggregation, but sufficient bandwidth is needed. If non-routing, then the superspine will need to notify the spine nodes of their fallen leaves, so that they can perform negative disaggregation.

In various embodiments, a POD in an SDN fabric can be promoted to function as a superspine, effectively forming a "super POD" For example, as shown in FIG. 5B, POD 318b can be selected arbitrarily (e.g., randomly) and rewired to function 'above' spine layer 312. By doing so, POD 318b may receive all northbound advertisements, meaning that it will have all link state information for SDN fabric 500. In turn, this link state information can be used to identify any disconnections between a leaf node in leaf layer 316 and a spine node in spine layer 312.

Designation of a particular POD as a super POD can be achieved in a number of ways. For example, as shown in FIG. 5C, the offer mechanism of the RIFT protocol can be used to establish POD 318b as a super POD in SDN fabric 500. In general, the RIFT protocol uses the concept of levels, to form a hierarchy of nodes within an SDN fabric. For example, leaf nodes at leaf layer 316 may have their level set to a value '0,' of the lowest level possible.

While manual configuration of each level is supported, RIFT also supports zero touch provisioning (ZTP), whereby nodes autoconfigure themselves after attaching to the hierarchy. To set the level of a node in RIFT using ZTP, nodes in an SDN fabric may exchange level offers and, in turn, derive their levels as MAX(HAL-1, 0), where HAL is the highest available level (HAL) seen by a node from its received level offers. Note that the offered level can also be undefined, if the node is not assumed to be a leaf node. If the node begins with a level value of '0,' i.e., it is presumed to be a leaf node, it does not need to compute a HAL from its received offers.

In various embodiments, POD 318b may be designated as a super POD either through manual configuration or by leveraging the offer mechanism of ZIP in RIFT. For example, as shown, the leaf nodes in leaf layer 316 can be forced to an offer of '0', the spine nodes forming a belt with a much higher offer (e.g., '9000' or any other suitable value), and increasing the offer of the nodes in POD 318b to an even higher offer. In some cases, the highest nodes (e.g., L3 and L4) in POD 318b can even be forced to having an infinite offer. In such cases, these nodes may be considered to be 'root' nodes.

Once established as a super POD, the super POD may be considered north within the SDN fabric and receive all northbound flooding. Thus, POD 318b may receive all link state information for SDN fabric 500, allowing it to leverage this viewpoint to identify fallen leaves. For example, if a particular leaf node in leaf layer 316 loses connectivity with a particular spine node in spine layer 312, POD 318b will still receive information regarding this, allowing for corrective measures to be initiated.

Note that a super-POD may not be used for forwarding, under normal conditions, while receiving northbound advertisements so that it has all link state information for the entire fabric. However, as a super POD is also itself a POD, it may further be used to attach management tools to the SDN fabric, such as automation functions, operation, administration and management (OAM) functions, or visibility functions. Identification of fallen leaves can be seen as simply another one of these functions. For example, in one embodiment, POD 318b may itself be connected to a server/service configured to identify fallen leaves within SDN fabric 500 based on the link state information provided to POD 318b via the northbound advertisements.

Once a fallen leaf has been identified, repairing the disconnection between that leaf node and its corresponding spine node will depend on whether the super POD is routing or non-routing. In some cases, if super POD 318b is a routing POD, it may attempt to repair a fallen leaf by advertising a corrective route south towards the spine as a default route. In another embodiment, super POD 318b may simply disaggregate, positively, the fallen leaves to the spine nodes that lost those leaves. More generally, if POD 318b is a routing POD, it may form a route in SDN fabric 500 that connects the spine node in spine layer 312 that cannot see the fallen leaf to another spine node in spine layer 312 that can. A routing root node in POD 318b may also be used as to connect other (remote) fabrics and advertise default, or the specific external prefixes, that can be reached.

In cases in which super POD 318b is non-routing, repairing a fallen leaf in SDN fabric 500 may entail notifying the spine node that cannot reach the fallen leaf, so that negative disaggregation can be performed with respect to the fallen leaf.

Figure 6:
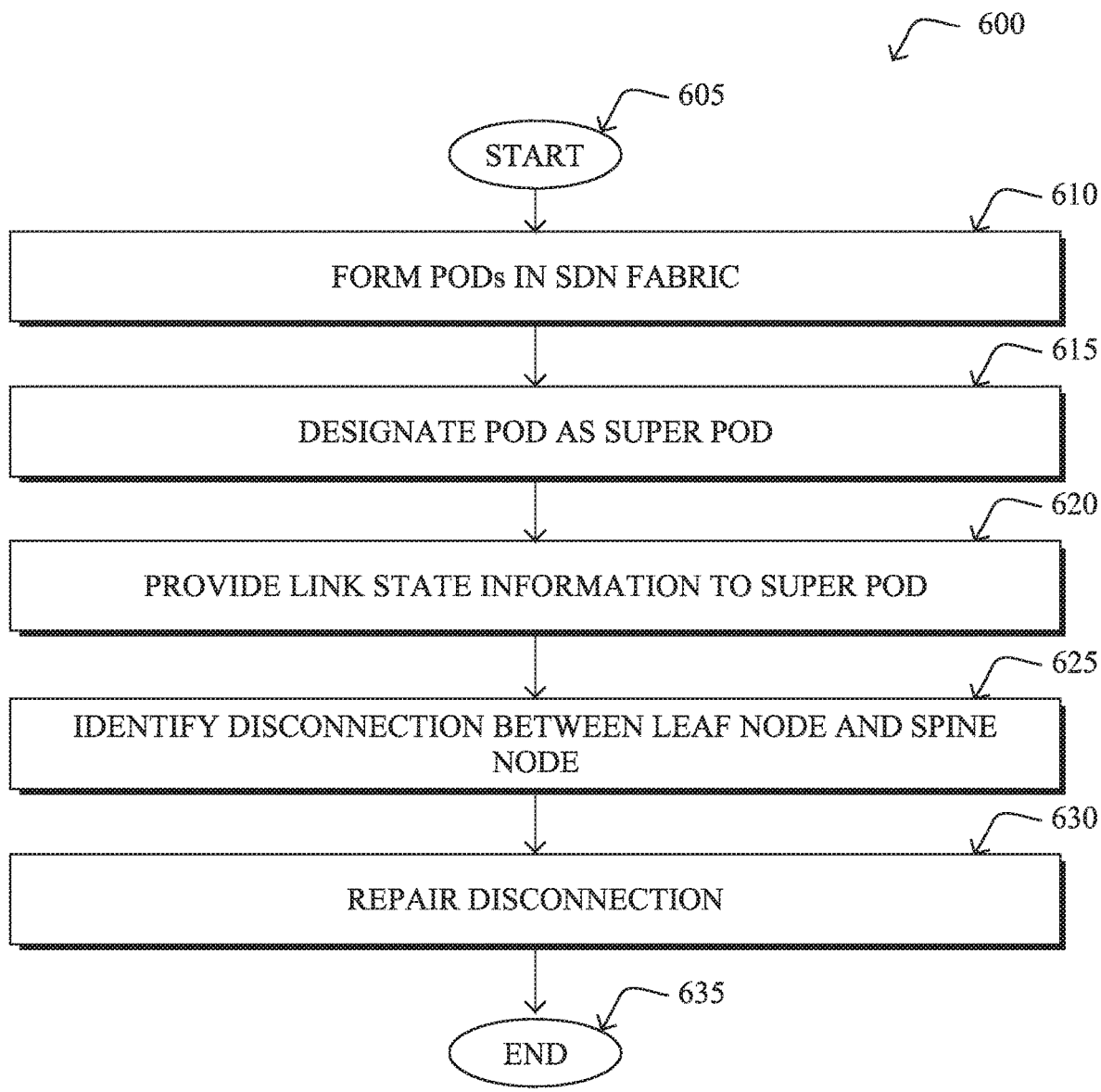
FIG. 6 illustrates an example simplified procedure for repairing a fallen leaf in an SDN fabric using a super POD.

FIG. 6 illustrates an example simplified procedure for repairing a fallen leaf in an SDN fabric using a super POD, in accordance with one or more embodiments described herein. For example, one or more non-generic, specifically configured devices in an SDN fabric (e.g., a device 200) may perform procedure 600 by executing stored instructions (e.g., process 248). The procedure 600 may start at step 605, and continues to step 610, where, as described in greater detail above, a plurality of PODs in an SDN fabric. Each POD may comprise a plurality of leaf nodes and connected to a plurality of spine nodes in a spine layer of the SDN fabric.

At step 615, as detailed above, one of the plurality of PODs may be designated as a super POD. In some cases, this designation may be made by manually configuring the level of the nodes in the POD. In further embodiments, such as when ZTP is used with RIFT, this can also be achieved by increasing the offered level of the nodes in the POD to a suitably high level (e.g., an infinite valued offer), effectively turning the super POD into a superspine layer for the fabric.

At step 620, link state information may be provided to the super POD through the sending of northbound advertisements in the fabric to the super POD, as described in greater detail above. Notably, as the super POD may function as a superspine layer at the northmost point in the fabric, northbound flooding for the entire network will reach the super POD. In doing so, the super POD will have access to the link states for the entire fabric.

At step 625, as detailed above, a disconnection may be identified between a leaf node in the SDN fabric and a particular one of the spine nodes in the spine layer, based on the link state information provided to the super POD. In other words, as the super POD has view of the entire fabric, fallen leaves can be easily computed either directly within the super POD or by a server connected to the super POD.

At step 630, the disconnection may be repaired between the leaf node and the particular spine node in the spine layer, as described in greater detail above. In some embodiments, the designated super POD may be configured to perform routing and establish, via the super POD, a route between the particular spine node and another spine node in the spine layer that is connected to the leaf node. For example, the super POD may inject the route as a default route into the SDN fabric. In other cases, the super POD may inject the route as a positive route towards the leaf node. If the super POD is non-routing, the repair may entail initiating negative disaggregation to remove routes to the disconnected leaf node in the SDN fabric that include the particular spine node. For example, the super POD may notify the spine node(s) that can no longer reach the fallen leaf, so that they can perform the negative disaggregation. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism for identifying and correcting fallen leaf conditions in an SDN fabric through the use of one or more super PODs.

While there have been shown and described illustrative embodiments that provide for the use of super PODs in an SDN fabric, it is to be understood that various other adaptations and modifications may be made within the spirit and scope of the embodiments herein. For example, while certain protocols are shown, such as RIFT, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    forming a plurality of PODs in a software defined networking (SDN) fabric, each POD comprising a plurality of leaf nodes and connected to a plurality of spine nodes in a spine layer of the SDN fabric;
    designating one of the plurality of PODs as a super POD;
    providing link state information for the entire fabric to the super POD by sending northbound advertisements in the fabric to the super POD;
    identifying a disconnection between a leaf node in the SDN fabric and a particular one of the spine nodes in the spine layer, based on the link state information provided to the super POD; and
    repairing the disconnection between the leaf node and the particular spine node in the spine layer.

2. The method as in claim 1, wherein designating one of the plurality of PODs as a super POD comprises:
    increasing a Routing in Fat Trees (RIFT) offer associated with the designated POD.

3. The method as in claim 1, wherein identifying the disconnection between the leaf node in the SDN fabric and the particular spine node in the spine layer, based on the link state information provided to the super POD, comprises:
    exporting the link state information from the super POD to a server, wherein the server identifies the disconnection.

4. The method as in claim 1, wherein repairing the disconnection between the leaf node and the particular spine node in the spine layer comprises:
   establishing, via the super POD, a route between the particular spine node and another spine node in the spine layer that is connected to the leaf node.

5. The method as in claim 4, wherein establishing, via the super POD, the route between the particular spine node and another spine node in the spine layer that is connected to the leaf node by:
   injecting, by the super POD and into the SDN fabric, the route as a default route.

6. The method as in claim 4, wherein establishing, via the super POD, the route between the particular spine node and another spine node in the spine layer that is connected to the leaf node by:
   injecting, by the super POD and into the SDN fabric, the route as a positive route towards the leaf node.

7. The method as in claim 1, wherein repairing the disconnection between the leaf node and the particular spine node in the spine layer comprises:
   initiating, by the super POD, negative disaggregation to remove routes to the disconnected leaf node in the SDN fabric that include the particular spine node.

8. The method as in claim 1, wherein the super POD is designated arbitrarily from among the plurality of PODs.

9. An apparatus, comprising:
   one or more network interfaces to communicate with a software defined networking (SDN) fabric;
   a processor coupled to the network interfaces and configured to execute one or more processes; and
   a memory configured to store a process executable by the processor, the process when executed configured to:
     form a plurality of PODs in the SDN fabric, each POD comprising a plurality of leaf nodes and connected to a plurality of spine nodes in a spine layer of the SDN fabric;
     designate one of the plurality of PODs as a super POD;
     provide link state information for the entire fabric to the super POD by sending northbound advertisements in the fabric to the super POD;
     identify a disconnection between a leaf node in the SDN fabric and a particular one of the spine nodes in the spine layer, based on the link state information provided to the super POD; and
     repair the disconnection between the leaf node and the particular spine node in the spine layer.

10. The apparatus as in claim 9, wherein the apparatus designates one of the plurality of PODs as a super POD by:
   increasing a Routing in Fat Trees (RIFT) offer associated with the designated POD.

11. The apparatus as in claim 9, wherein the apparatus identifies the disconnection between the leaf node in the SDN fabric and the particular spine node in the spine layer, based on the link state information provided to the super POD, by:
   exporting the link state information from the super POD to a server, wherein the server identifies the disconnection.

12. The apparatus as in claim 9, wherein the apparatus repairs the disconnection between the leaf node and the particular spine node in the spine by comprises:
   establishing, via the super POD, a route between the particular spine node and another spine node in the spine layer that is connected to the leaf node.

13. The apparatus as in claim 12, wherein the apparatus establishes, via the super POD, the route between the particular spine node and another spine node in the spine layer that is connected to the leaf node by:
   injecting, via the super POD and into the SDN fabric, the route as a default route.

14. The apparatus as in claim 12, wherein the apparatus establishes, via the super POD, the route between the particular spine node and another spine node in the spine layer that is connected to the leaf node by:
   injecting, via the super POD and into the SDN fabric, the route as a positive route towards the leaf node.

15. The apparatus as in claim 9, wherein the apparatus repairs the disconnection between the leaf node and the particular spine node in the spine layer by:
   initiating, from the super POD, negative disaggregation to remove routes to the disconnected leaf node in the SDN fabric that include the particular spine node.

16. The apparatus as in claim 9, wherein the super POD is designated arbitrarily from among the plurality of PODs.

17. A tangible, non-transitory, computer-readable medium storing program instructions that cause a device of a software defined networking (SDN) fabric to execute a process comprising:
   forming a plurality of PODs in the SDN fabric, each POD comprising a plurality of leaf nodes and connected to a plurality of spine nodes in a spine layer of the SDN fabric;
   designating one of the plurality of PODs as a super POD;
   providing link state information for the entire fabric to the super POD by sending northbound advertisements in the fabric to the super POD;
   identifying a disconnection between a leaf node in the SDN fabric and a particular one of the spine nodes in the spine layer, based on the link state information provided to the super POD; and
   repairing the disconnection between the leaf node and the particular spine node in the spine layer.

18. The computer-readable medium as in claim 17, wherein designating one of the plurality of PODs as a super POD comprises:
   increasing a Routing in Fat Trees (RIFT) offer associated with the designated POD.

19. The computer-readable medium as in claim 17, wherein repairing the disconnection between the leaf node and the particular spine node in the spine layer comprises:
   establishing, via the super POD, a route between the particular spine node and another spine node in the spine layer that is connected to the leaf node.

20. The computer-readable medium as in claim 17, wherein repairing the disconnection between the leaf node and the particular spine node in the spine layer comprises:
   initiating, by the super POD, negative disaggregation to remove routes to the disconnected leaf node in the SDN fabric that include the particular spine node.

\* \* \* \* \*

UNITED STATES PATENT AND TRADEMARK OFFICE
CERTIFICATE OF CORRECTION

PATENT NO. : 10,785,094 B1
APPLICATION NO. : 16/393093
DATED : September 22, 2020
INVENTOR(S) : Pascal Thubert et al.

Page 1 of 1

It is certified that error appears in the above-identified patent and that said Letters Patent is hereby corrected as shown below:

In the Specification

In Column 10, Line 33, please amend as shown:
leveraging the offer mechanism of ZTP in RIFT. For Signed and Sealed this
Twenty-ninth Day of December, 2020

Andrei Iancu
*Director of the United States Patent and Trademark Office*